US011678271B2

(12) United States Patent
Pefkianakis et al.

(10) Patent No.: US 11,678,271 B2
(45) Date of Patent: Jun. 13, 2023

(54) METHOD OF MANAGEMENT OF A WIRELESS INTERFACE OF A DEVICE AND CORRESPONDING WIRELESS DEVICE

(71) Applicant: THOMSON LICENSING, Issy les Moulineaux (FR)

(72) Inventors: Ioannis Pefkianakis, Palo Alto, CA (US); Jaideep Chandrashekar, San Francisco, CA (US); Henrik Lundgren, Le Plessis Robinson (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 573 days.

(21) Appl. No.: 14/907,275

(22) PCT Filed: Jul. 21, 2014

(86) PCT No.: PCT/EP2014/065621
§ 371 (c)(1),
(2) Date: Jan. 23, 2016

(87) PCT Pub. No.: WO2015/011091
PCT Pub. Date: Jan. 29, 2015

(65) Prior Publication Data
US 2016/0165544 A1 Jun. 9, 2016

(30) Foreign Application Priority Data
Jul. 23, 2013 (EP) .................................... 13306057

(51) Int. Cl.
*H04W 52/02* (2009.01)
(52) U.S. Cl.
CPC ... *H04W 52/0251* (2013.01); *H04W 52/0254* (2013.01); *Y02D 30/70* (2020.08)

(58) Field of Classification Search
CPC .......... H04W 52/0251; H04W 52/0254; Y02B 60/50
See application file for complete search history.

(56) References Cited

U.S. PATENT DOCUMENTS 5,892,959 A * 4/1999 Fung ..................... G06F 1/3203
713/323
9,241,314 B2 * 1/2016 Ismail ............... H04W 52/0258
(Continued)

FOREIGN PATENT DOCUMENTS

AU 2013100569 5/2013
CN 1252190 A 5/2000
(Continued)

OTHER PUBLICATIONS

Manweiler et al. "Avoiding the Rush Hours: WiFi Energy Management via Traffic Isolation," MobiSys '11, Bethesda, Maryland, USA, Jun. 28-Jul. 1, 2011.
(Continued)

*Primary Examiner* — Jamal Javaid
*Assistant Examiner* — Ryan C Kavleski
(74) *Attorney, Agent, or Firm* — Meagher Emanuel Laks Goldberg & Liao, LLP

(57) ABSTRACT

The present invention generally relates to a management of a wireless interface of a device. The management of the wireless interface includes monitoring of at least one component of the device, other than a wireless network element followed by switching a power state of the wireless interface to another power state according to the monitored activity.

12 Claims, 5 Drawing Sheets

(56) References Cited

U.S. PATENT DOCUMENTS

| | | | |
|---|---|---|---|
| 2004/0076177 A1* | 4/2004 | Koch | H04W 52/0235 370/465 |
| 2005/0147049 A1* | 7/2005 | Ganesan | H04M 1/2535 370/241 |
| 2008/0086528 A1* | 4/2008 | Garg | G06F 11/3495 709/204 |
| 2011/0171909 A1 | 7/2011 | Jung et al. | |
| 2011/0212746 A1* | 9/2011 | Sarkar | H04W 88/06 455/552.1 |
| 2011/0242268 A1* | 10/2011 | Kim | H04M 7/0063 348/14.04 |
| 2011/0274021 A1 | 11/2011 | He et al. | |
| 2012/0023190 A1 | 1/2012 | Backholm et al. | |
| 2012/0052873 A1* | 3/2012 | Wong | H04W 52/0251 455/456.1 |
| 2012/0140651 A1* | 6/2012 | Nicoara | H04W 52/02 370/252 |
| 2012/0176946 A1* | 7/2012 | Hunt | H04W 52/0229 370/311 |
| 2012/0264416 A1 | 10/2012 | Pica et al. | |
| 2013/0176869 A1 | 7/2013 | Finlow-Bates et al. | |
| 2013/0326251 A1* | 12/2013 | Adewale | G06F 1/3215 713/323 |
| 2014/0094159 A1* | 4/2014 | Raleigh | H04W 24/02 455/418 |
| 2014/0141795 A1* | 5/2014 | Abraham | H04W 24/00 455/456.1 |

FOREIGN PATENT DOCUMENTS

| | | |
|---|---|---|
| CN | 1399418 A | 2/2003 |
| CN | 1934881 A | 3/2007 |
| CN | 101084651 A | 12/2007 |
| CN | 10211185 A | 6/2011 |
| CN | 102111858 A | 6/2011 |
| CN | 102640541 A | 8/2012 |
| CN | 102714885 A | 10/2012 |
| JP | 2004328593 A | 11/2004 |
| JP | 2009017575 | 1/2009 |
| JP | 2011527846 | 11/2011 |
| JP | 201270403 | 4/2012 |
| KR | 10-2011-0116071 A | 10/2011 |
| TW | 201013390 A1 | 9/2009 |
| WO | WO2006069281 A2 | 6/2006 |
| WO | WO2010030945 A1 | 3/2010 |
| WO | 2012124016 A1 | 9/2012 |
| WO | 2013078408 A1 | 5/2013 |

OTHER PUBLICATIONS

Pefkianakis et al. "What is Wrong/Right with IEEE 802.11n Spatial Multiplexing Power Save Feature," 2011 19th IEEE International Conference on Network Protocols, Jan. 1, 2011.

Pyles et al. "SAPSM: Smart adaptive 802.11 PSM for Smartphones," UbiComp '12, Pittsburgh, USA, , Sep. 5-8, 2012.

Pyles et al. "SiFi: Exploiting VoIP Silence for WiFi Energy Savings in Smart Phones," UbiComp '11, Beijing, China, Sep. 17-21, 2011.

Rozner et al. "NAPman: Network-Assisted Power Management for WiFi Devices," MobiSys '10, San Francisco, California, USA, Jun. 15-18, 2010.

Tan et al. "PSM-throttling: Minimizing Energy Consumption for Bulk Data Communications in WLANs," IEEE ICNP '07, Jan. 1, 2007.

Warty et al. "A First Look at 802.11n Power Consumption in Smartphones," PINGEN '12, Istanbul, Turkey, Aug. 26, 2012.

Agarwal et al. "Wireless Wakeups Revisited: Energy Management for VoIP over Wi-Fi Smartphones," MobiSys '07, San Juan, Puerto Rico, USA, Jun. 11-14, 2007.

Chen et al. "M-PSM: Mobility-Aware Power Save Mode for IEEE 802.11 WLANs," 2011 31st International Conference on Distributed Computing Systems, Jan. 1, 2011.

Dogar et al. "Catnap: Exploiting High Bandwidth Wireless Interfaces to Save Energy for Mobile Devices," MobiSys '10, San Francisco, California, USA, Jun. 15-18, 2010.

Halperin et al. "Demystifying 802.11n power consumption," USENIX Workshop on Power Aware Computing and Systems, Oct. 1, 2010.

Jang et al. "Snooze: Energy Management in 802.11n WLANs," ACM CoNEXT 2011, Tokyo, Japan, Dec. 6-9, 2011.

Kim et al. "Improving Energy Efficiency of Wi-Fi Sensing on Smartphones," IEEE Infocom 2011, Jan. 1, 2011.

Li et al. "Energy based Rate Adaptation for 802.11n," MobiCom '12, Istanbul, Turkey, Aug. 22-26, 2012.

Liu et al. "Micro Power Management of Active 802.11 Interfaces," MobiSys '08, Breckenridge, Colorado, USA, Jun. 17-20, 2008.

Hu et al. "Energy-efficient Scheduling Strategies in IEEE 802.11 Wireless LANs," Proceedings of the 2012 IEEE International Conference on Computer Science and Automation Engineering (CSAE 2012), Jan. 1, 2012.

Kondo et al. "Wake-up Radio using IEEE 802.11 Frame Length Modulation for Radio-On-Demand Wireless LAN," 2011 IEEE 22nd International Symposium on Personal, Indoor and Mobile Radio Communications (PIMRC 2011), Jan. 1, 2011.

Ryoo et al. "Energy Saving MAC for MIMO Systems," ICC 2009—2009 IEEE International Conference on Communications, Jan. 1, 2009.

Jing et al. "Energy-efficient Web browser over IEEE 802.11 wireless networks," Chinese Journal of Electronics | vol. 21, No. 1 | 144-8, Jan. 1, 2012.

English translation of Korean Office Action issued in Korean application 10-2016-7001735, dated Jan. 21, 2020.

European Search Report issued in European application 19 20 5848, dated Dec. 11, 2019.

\* cited by examiner

METHOD OF MANAGEMENT OF A WIRELESS INTERFACE OF A DEVICE AND CORRESPONDING WIRELESS DEVICE

This application claims the benefit, under 35 U.S.C. § 365 of International Application PCT/EP14/065621, filed Jul. 21, 2014, which was published in accordance with PCT Article 21(2) on Jan. 29, 2015 in English and which claims the benefit of European patent application 13306057.4, filed Jul. 23, 2013.

1. FIELD OF INVENTION

The present invention generally relates to a method of management of a wireless interface of a device. Embodiments of the invention enable management of power consumption of a wireless device in a view to optimize and reduce power consumption.

2. TECHNICAL BACKGROUND

Wireless interface typically consume amounts of energy. Thus, there is a need for devices implementing one or several wireless interfaces (especially for devices using a battery) to save energy. Some systems, such as systems based on active periods and sleep periods specified by a network protocol, enable power consumption to be reduced; however, they are not optimized to save energy.

There is thus a need to improve energy saving in wireless systems.

3. INVENTION SUMMARY

The present invention proposes to alleviate some of the inconveniences of prior art by enabling improvement of energy saving in a wireless device (e.g. a smart phone, a laptop, a game console, a music or video device).

According to a first aspect of the invention there is provided a method of management of a wireless interface of a device, the wireless interface being for connection to a wireless local area network the method comprising: monitoring activity of at least one component of the device, other than a wireless network element operable for connection to the wireless local area network; switching a power state of the wireless interface to another power state on the basis of the monitored activity.

In an embodiment, the method includes determining if the device is within operating range of at least one accessible wireless local area network and switching the power state of the wireless interface if the device enters or leaves an operating range.

In an embodiment, the device comprises at least one mobile network interface for connection to a wireless wide area network, and wherein the power state of the wireless interface is switched from a low power state to a higher power state, in the case where activity is detected on the mobile network interface.

In an embodiment, the power state of the wireless interface is switched from a low power state to a higher power state, on the condition that the device is within operating range of at least one accessible wireless local area network.

In an embodiment, the power state of the wireless interface is switched from a low power state to a higher power state, on the condition that the application causing activity on the mobile network interface is compliant with a wireless local area network.

In an embodiment, the method includes verifying, in the case where the application belongs to a set of registered authorized applications, that can switch from the mobile network interface to the wireless interface; or does not belong to a set of registered unauthorized applications, that cannot switch from the mobile network interface to the wireless interface; the application being compliant with the wireless interface, in the case where the result of the verification is positive.

In an embodiment, the device comprises at least one screen, if the wireless interface is in a low power state, the wireless interface switches to a higher power state, in the case where the at least one screen of the wireless device is switched to an active state.

In an embodiment, the device comprises at least a location module, and in the case where the wireless interface is in a low power state, the wireless interface switches to a higher state if a move greater than a move threshold is detected by the location module.

A second aspect of the invention concerns a wireless device comprising a wireless interface for connection to a wireless local area network, the wireless device comprising: a monitor adapted to monitor activity of at least one component of the device, other than a wireless network element operable for connection to the wireless local area network; a switch adapted to switch a power state of the wireless interface to another power state on the basis of the monitored activity.

In an embodiment, a wireless network detection module is provided for determining if the device is within operating range of at least one accessible wireless local area network wherein the switch is configured to change the power state of the wireless interface if the device enters or leaves an operating range.

In an embodiment, at least one mobile network interface is provided for connection to a wireless wide area network, and wherein the switch is configured to switch the power state of the wireless interface from a low power state to a higher power state, in the case where activity is detected on the mobile network interface.

In an embodiment, the power state of the wireless interface is switched from a low power state to a higher power state, on the condition that the device is within operating range of at least one accessible wireless local area network.

In an embodiment, the power state of the wireless interface is switched from a low power state to a higher power state, on the condition that the application causing activity on the mobile network interface is compliant with a wireless local area network.

In an embodiment the wireless device is provided with mobile phone functionalities.

A further aspect of the invention provides a computer program product for a programmable apparatus, the computer program product comprising a sequence of instructions for implementing a method according to any embodiment of the first aspect of the invention when loaded into and executed by the programmable apparatus.

More specifically, the wireless interface being in a lower power state, it switches to a higher power state if an event associated with at least one monitored component of the device, other than a wireless network element, is detected.

In a specific embodiment, the wireless interface being in a high power state, the wireless interface switches to lower power state, if no activity is detected on the wireless interface during a time greater than an inactivity time threshold.

In a specific embodiment, the device comprising at least one screen, if the wireless interface is in a low power state, the wireless interface switches to a higher power state, if the at least one screen of the wireless device is switched to an active state.

According to a specific implementation, the device comprising at least a location module, if the wireless interface is in a low power state, the wireless interface switches to a higher state if a move greater than a move threshold is detected by the location module.

Specifically, the device comprising at least a mobile network interface, if the wireless interface is in a low power state, the wireless interface switches to a higher power state if an application use is detected on the mobile network interface.

In a particular embodiment, the device comprising at least a mobile network interface, if the wireless interface is in a low power state, the wireless interface switches to higher power state if an application use is detected on the mobile network interface and if the application is compliant with the wireless interface.

According to a variant, the method comprises a check, if the application belongs to a set of registered authorized applications, that can switch from the mobile network interface to the wireless interface; or does not belong to a set of registered unauthorized applications, that cannot switch from the mobile network interface to the wireless interface;

the application being compliant with the wireless interface, if the result of the check is positive.

In a specific embodiment, if the wireless interface is in a low power state and if an application use is detected on the mobile network interface, the wireless interface is prevented to switch to a higher power state, if no wireless network is available.

The invention also concerns a wireless device comprising:

a monitor adapted to monitor at least one component of the device, other than a wireless network element;

a switch adapted to switch a power state of the wireless interface to another power state according to the monitoring;

According to a specific implementation, the wireless interface being in low power state, the switch is adapted to switch the wireless interface to a higher power state if an event associated with at least one component of the device, other than a wireless network element, is detected.

In a variant, the wireless interface being in high power state, the switch is adapted to switch the wireless interface to lower power state, if no activity is detected on the wireless interface during a time greater than an inactivity time threshold.

According to specific embodiments, the wireless device comprises mobile phone functionalities.

4. LIST OF FIGURES

More advantages of the invention will appear through the description of particular, non-restricting embodiments of the invention, illustrated or not by means of the accompanying drawings. The description refers to the appended drawings in which.

5. DETAILED DESCRIPTION OF THE INVENTION

Figure 1:
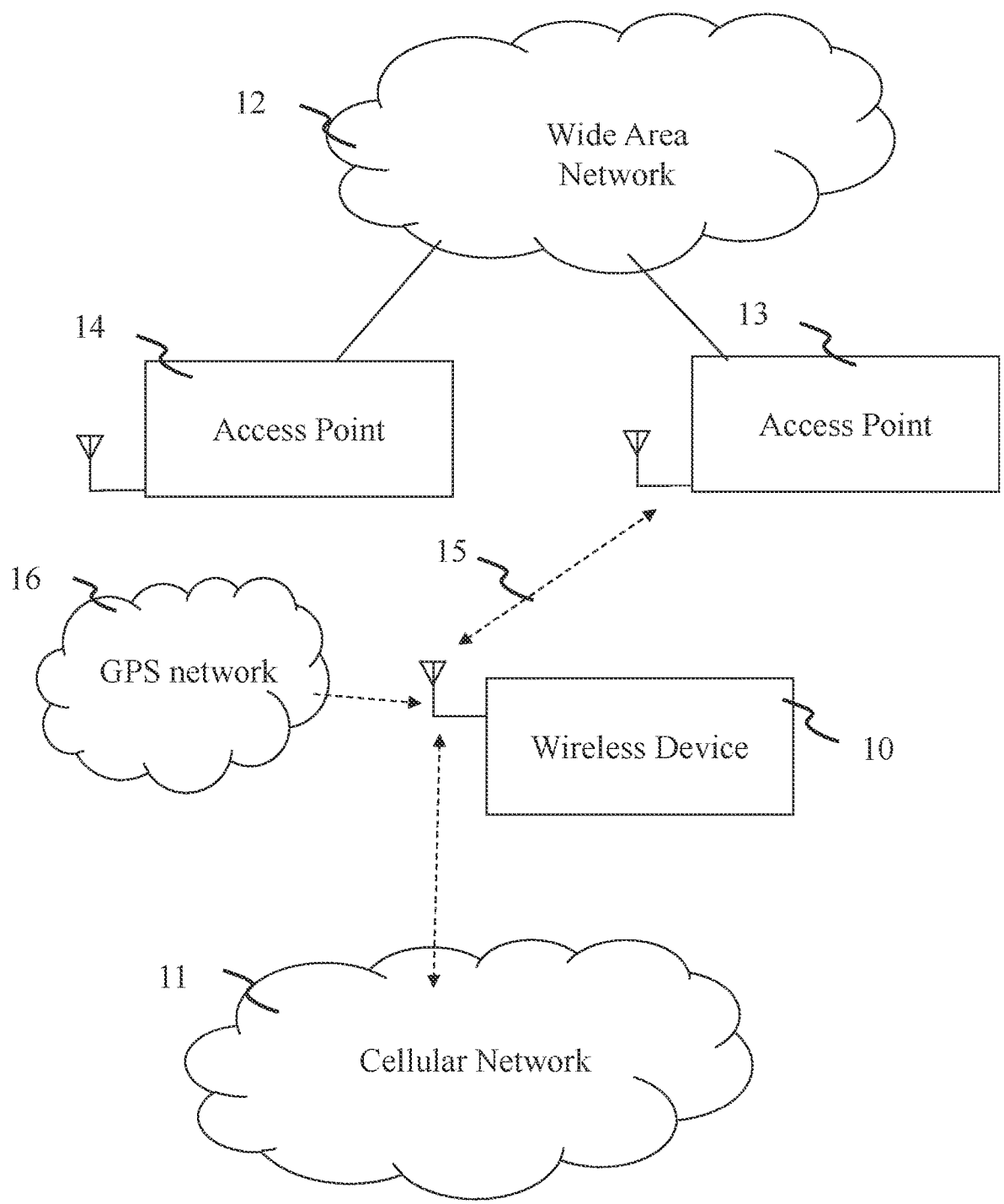
FIG. 1 represents an example of wireless devices in network environment.

A wireless network element is an element dedicated to wireless use such as antenna, RF stage, physical layer, MAC layer.

In embodiments of the invention, the monitoring of at least one component of a wireless device, that is not a wireless network element, and that may be an application, a location module, a screen, a key board, a cellular network element, is used to turn off or turn on a wireless interface of the wireless device. The inventors have realized that the wireless interface consumes some energy, even it is not used. Then, according to embodiments of the invention, a behavior or an event associated with a component of the wireless device, that is not a wireless network element is monitored to switch a power state (e.g. off/on power state or sleep/idle/active power states) of the wireless interface, while this behavior or event entails that it is respectively unlikely/likely that the wireless interface will be needed or used. For example, if a screen is switched on, then, it is possible or likely in some circumstances that the wireless interface will be used, then, if the wireless interface is on a low power state (e.g. off, sleep or idle), it is switch to a higher power state (e.g. on, idle or active). When the wireless interface is in high power state (e.g. on, active, idle), if no activity is detected on the wireless interface during a time greater than an inactivity time threshold (e.g. 10s.), the wireless interface switches to a lower power state (e.g. off, idle, sleep). This enables more time to be spent in off state (or sleep state) than in an idle state as defined in wireless standard such as, for example, IEEE 802.11, that enables reduced power consumption, but that still uses energy in in idle state (a state in which no data can be received or sent), the wireless interface is still powered. Even as this is a serious concern today, we expect the situation to be exacerbated in the near future, as high speed features make their way into the mobile devices. Recent features of IEEE 802.11 specifications (e.g. IEEE 802.11n or ac) such as Multiple-Input Multiple-Output (MIMO) and channel-bonding require even higher power at idle state than before. Embodiments of the invention enables the time in idle state to be reduced, the off state of wireless interface being privileged.

A number of power save mechanisms exist and have been supported in the IEEE 802.11 standards (PSM, A-PSM, SMPS). However, the energy gains from these mechanisms are modest in practice on mobile devices in the day to day use of smartphones and tablets, for the following reasons. First, they mainly rely on feedback from the wireless radio (e.g., losses, buffering, etc.) and are agnostic, even independent, of how the phone is being made use of. Consequently, they spend considerable time "blindly" looking for available networks or (potential) incoming traffic (even when it is obvious that these are unlikely to manifest). Second, they are infrastructure-driven and designed to extract the energy savings when the device is actually associated with an AP; the average user today spends a considerable amount of time outside of home or work, which are the two locations, generally speaking, where the device might have the required credentials to associate with an AP. Third, they offer limited adaptation of the power state by being completely focused on increased performance, while being oblivious of the power footprint of high speed features like MIMO and channel-bonding. Thus, even as the general principles to conserve energy are well established, i.e., convert idle states to sleep as much as possible, the actual gains derived from infrastructure solutions are limited.

Embodiments of the invention focus on a device (it is user centric or device centric). It usually makes a determination of whether there will likely be traffic in the near future based on a number of contextual signals and uses this to allow the interface to sleep. While a wireless interface is asleep, a device according to some embodiments of the invention tracks a mobile network interface and reactivates the wireless interface when any traffic activity is detected (so that the traffic can be offloaded). Some implementations of the invention also prevent unnecessary scanning for wireless network access points (APs), which also causes the interface to stay idle for long periods, by leveraging mobility and screen state information. Some implementations of the invention also incorporate an application monitor to prevent interface transition decisions that may adversely affect particular applications. Finally, some implementation of the invention also incorporate support for a low power level wireless module, which can be optionally used to allow the wireless interface to operate at a lowest power MIMO/channel-bandwidth setting, when idle listening cannot be avoided. Apart from this low power level module, embodiments of the invention can operate completely in a user space and can be implemented with very little overhead to the system.

Wireless devices (such WiFi devices) have usually three states:
  In sleep state, a wireless interface is turned off, consuming a small constant amount of power. Wireless interface cannot accommodate traffic while sleeping.
  In idle state, the wireless interface consumes some power, by being awake to listen for incoming transmissions. During idle state, a wireless device still receives beacon frames.
  In active state, the wireless interface is transmitting, receiving data.

Here, a low power state is defined as off state, sleep state or idle state; a high power state is defined as on state, idle state or active state. Considering off state and idle state, higher states are respectively on state and active. Considering a sleep state, higher states are idle and active states. Considering on state and idle state, lower states are respectively off state and sleep state. Considering an active state, lower states are idle and sleep states.

When three states, sleep, active and idle states (idle and active states corresponding both to an on-state; the device on idle state cannot receive or transmit data on wireless link, however, the wireless interface is on) are identified, the estimated energy, E, consumed in one unit of time is equal to:

$$E = P_{rx} \cdot T_{rx} + P_{tx} \cdot T_{tx} + P_{idle} \cdot T_{idle} + P_{sleep} \cdot T_{sleep}.$$

where,
  $P_{rx}$ (respectively $P_{tx}$) represents an estimation of Power consumption for data reception (respectively transmission) in active state;
  $T_{rx}$ (respectively $T_{tx}$) represents needed time in one unit of time to receive (respectively transmit) the required application data rate (active state);
  $P_{sleep}$ represents estimation of Power consumption in sleep state;
  $T_{sleep}$ represents the time in idle state in one unit of time.

$P_{idle}$ represents estimation of Power consumption in sleep state, as estimated;
  $T_{idle}$ represents the time in sleep state in one unit of time.

So, according to the invention, the use of sleep state is optimized.

Here, a variant must be understood as a variant of the invention and an embodiment or implementation are an embodiment or implementation of the invention.

A wireless interface having low (respectively high) power state corresponds to a wireless interface consuming a low (respectively high) power level. A wireless interface having a lower (higher) power state than another state correspond to a wireless interface consuming a lower (respectively higher) power level than in the other state.

FIG. 1 represents a wireless device 10 according to an embodiment of the invention, in a typical network environment.

The wireless device 10 is adapted to be connected through a wireless link 15 with wireless access points 13 and/or 14, that are themselves linked to wide area network 12. The wireless device 10 and access points 13 and 14 comprise each at least a wireless interface adapted to enable local wireless communication; typically, they can communicate together according to a protocol such as IEEE 802.11, WiFi®, IEEE 802.15 and its variants or any other wireless local communication protocol.

The wireless device 10 also comprises a GPS interface able to get its location from a GPS network.

The wireless device 10 also comprises a mobile interface able to communicate with a mobile network 11 (typically a cellular network, e.g. a 3G or LTE network).

Figure 2:
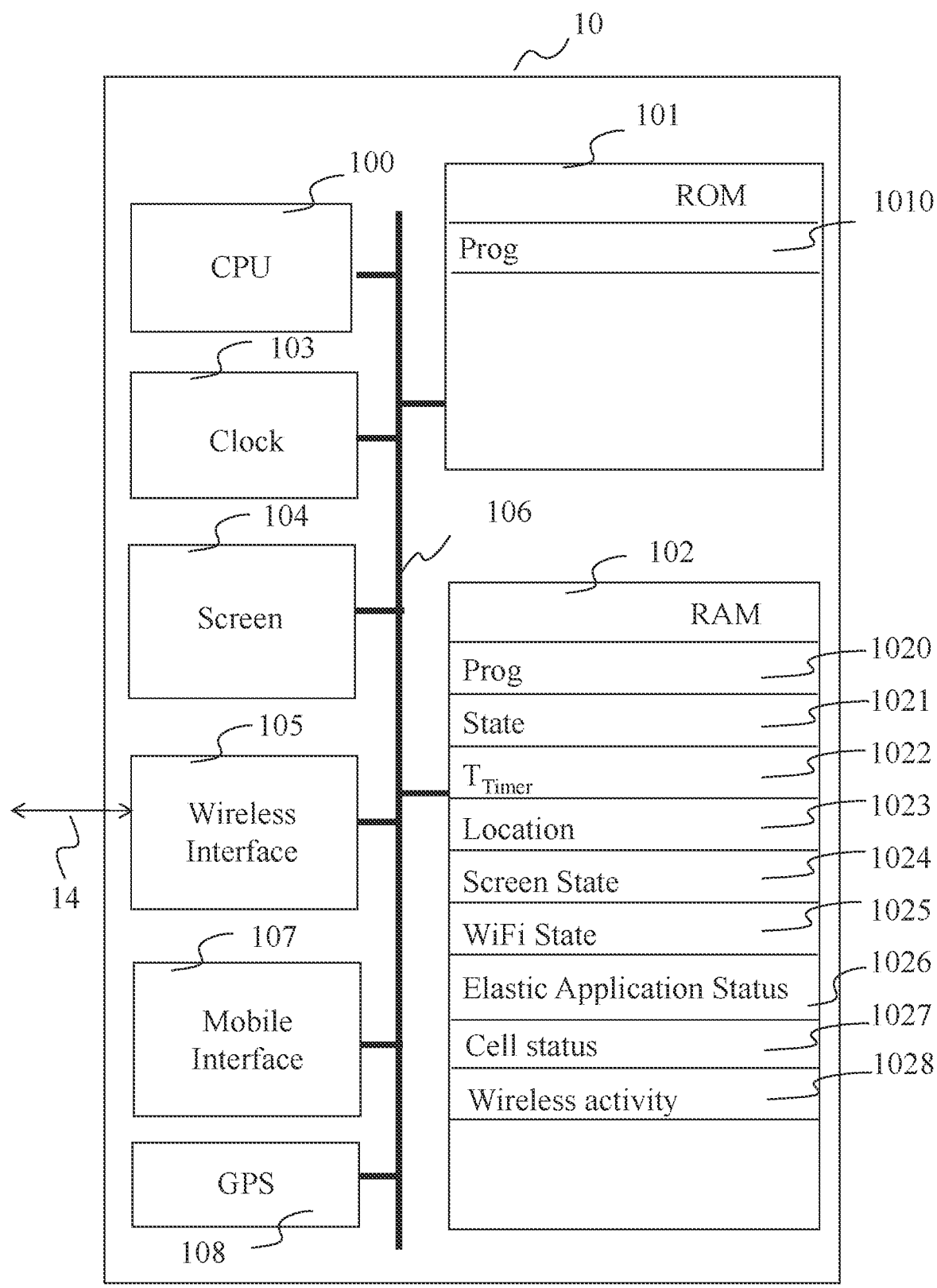
FIG. 2 represents an exemplary architecture of the wireless device represented in FIG. 1, according to an embodiment of the invention.

FIG. 2 diagrammatically shows a preferred embodiment of the wireless device 10, according to the invention.

The wireless device 10 comprises, connected to each other by an address and data bus 106, also transporting a clock signal:
  a microprocessor 100 (or CPU);
  a non-volatile memory of the ROM type (Read Only Memory) 101;
  a Random Access Memory or RAM 102;
  a clock 103;
  a screen 104;
  a wireless network interface 105 adapted to communicate with a wireless Local Area Network or another wireless device through the wireless link 14;
  a mobile network interface 107 (typically cellular network interface) adapted to communicate with the mobile network 11; and
  a GPS interface 108 adapted to determine a position of the device 10 using GPS network 16.

Each of the elements 100 to 108 is well known by a person skilled in the art. These common elements are not described here.

The ROM memory 101 notably comprises a "prog" program 1010. The algorithms implementing the steps of the method specific to the invention and described below are stored in the memory ROM 101 associated with the device 10 implementing these steps, and more specifically in program 1010. When powered up, the microprocessor 100 loads in RAM 102 and runs the instructions of these algorithms.

The random access memory 102 notably comprises:
  in a register 1020, a loaded program corresponding to program 1010;
  a state 1021, typically ON or OFF of the wireless device 105;
  a value of a timer <<$T_{Timer}$>> in a register 1022;

an information 1023 representative of a location or geographical position of the device 10 (and, according to a specific implementation, of at least a location of authorized or location of absence of any authorized network);

a screen state 1024, typically ON or OFF;

a wireless interface state 1025, typically ON or OFF;

a status of application 1026, typically elastic or not, or authorized or not authorized for a switch from mobile network interface to wireless network; according to a variant, this register comprises a list of authorized applications for this switch; according to another variant, this register comprises a list of non-authorized applications for this switch;

a mobile interface state 1027, typically ON or OFF; and a wireless activity state 1028, typically inactive or active;

according to a variant, this register comprises a time since the latest activity on wireless interface.

Figure 3:
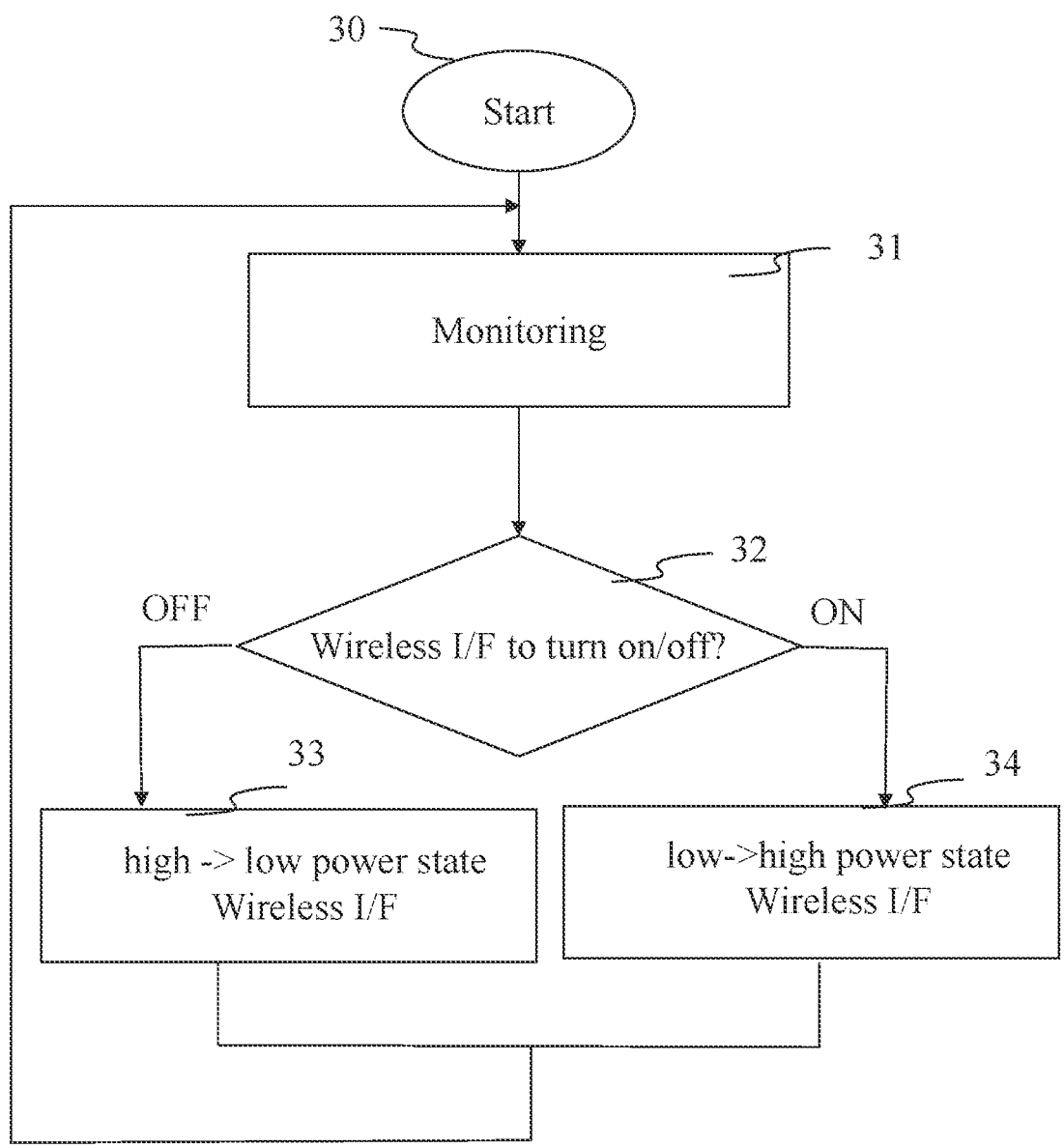
FIGS. 3 and 4 are flowcharts illustrating steps of methods management of wireless interface of wireless device of FIG. 2 in accordance with embodiments of the invention.

FIG. 3 schematically illustrates steps of a method of management of a wireless interface as implemented for example in the device 10 according to an embodiment of the invention.

During a first step 30, the device 10 initializes its various components and variables.

Then, during a step 31, the device 10 monitors at least one of its components that are not a wireless network element. This or these components belong to a set comprising a screen, a man-machine interface (e.g. a keyboard or a mouse), a location module, an application, or a mobile network element. A wireless network is considered as a local network, typically compliant with IEEE 802.11, WiFi®, IEEE 802.15 and its variants or any other wireless local communication network. A mobile network is typically a wide area network (typically a cellular network such as a 3G or LTE network). In particular, the device 10 monitors some specific events applied to at least of its components, that are not a wireless network element, such as a change of power state, state of applications that may use the wireless interface and another network interface, a change in location of the device and a switch on of a device screen.

Then, during a test 32, the device 10 checks if it should switch a power state of the wireless interface to another power state according to the monitoring; more specifically, the device 10 decreases or increases the power state of the wireless interface according to the monitoring; e.g. if a specific monitored event occurs, and if the likelihood to use the wireless interface increases or goes beyond a threshold, then the device 10 switches the power state of the wireless interface to a higher power during a step 33; e.g. if an application using another network interface (e.g. mobile network interface) can also run on the wireless interface, then the device 10 also switches the power state the wireless interface to a higher power state; on the contrary, if no activity is detected on the wireless interface during a time equal to or greater than a timer threshold (e.g. 10 seconds), then, the power state wireless interface is switched to a lower power state during a step 34. After steps 33 or 34, step 31 is reiterated. According to a variant of invention, step 31 is done in parallel of step 32, as a background task.

Figure 4:
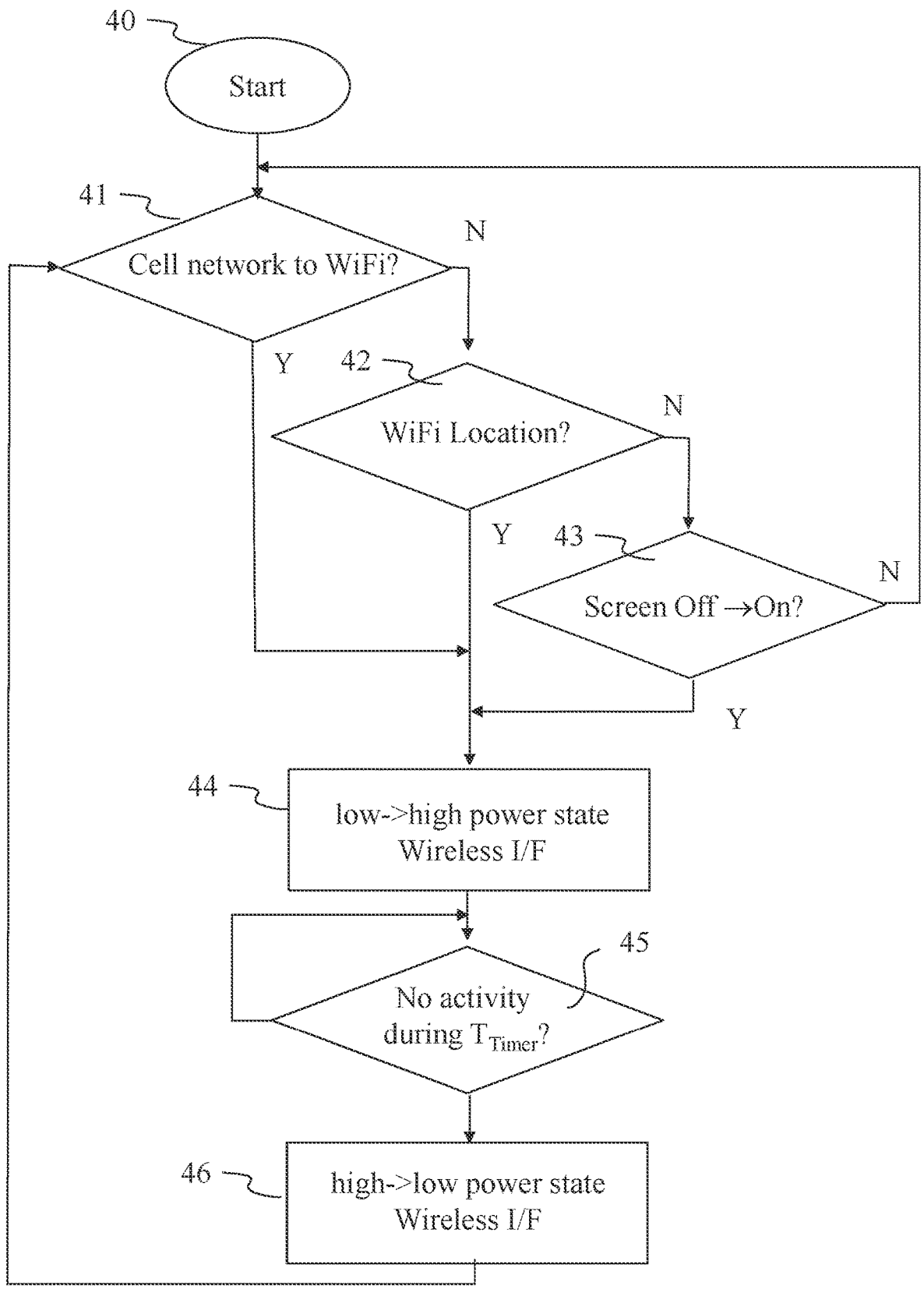

FIG. 4 schematically illustrates detailed steps of a method of wireless interface management, as implemented in the device 10 for example according to an embodiment of the invention.

During a first step 40, the device 10 initializes its various components and variables. At the end of step 40, for exemplary purpose, the wireless interface 105 is assumed to be in a low power state (off, sleep or idle).

Then, during a test 41, the device 10 checks if an application use is detected on the mobile network interface and, more specifically, if an active application tries to use or uses the mobile network interface 107 may switch to the wireless interface 105.

It result of test 41 is negative (no application using the mobile network interface 107 may switch to the wireless interface 105), during a test 42, the device 10 checks the device has made a move greater than a move threshold; more specifically, the device 10 checks if location has changed since a previous registered location corresponding to absence of wireless network in the range of the device 10. If the difference between current location and the previous location is greater than a location threshold (for example, equal to a mean value of the maximum value of a range of wireless network access point, e.g. equal to 20 meters), then the location is considered as changed and the current location is registered. Then, the device 10 checks if it is or is not in a range of a wireless network. This can be performed on different ways, e.g. by checking location using a server comprising a list of wireless network locations or by, at least momentarily, turning on the wireless interface to check if the device is in a range of an authorized wireless network (authorized network means that the device is authorized to use this network), by using a local list of location of available wireless authorization networks (this list advantageously using registered location of wireless networks that have previously been used by the device; this may be advantageous, because the number of corresponding data may be reduced as most of devices are using a specific work wireless network and a specific home wireless network) and/or by using a list of locations identifying locations where no authorized wireless network is available (this list advantageously using registered locations that have previously been tested and where no authorized network has been found by the device). The test 42 advantageously avoids useless blind scan of wireless networks.

If the result of test 42 is negative (i.e. the location of the device is considered as having not changed, or the device is considered as not being in the ranged of an authorized wireless network), then during a test 43, the device checks if at least a screen of the wireless device has switched on since a previous check of screen in off state or wireless interface in off state.

If the result of test 43 is negative (i.e. no device screen has switched on), the step 41 is reiterated. According to a variant, the step 41 is triggered and reiterated after a minimum test period (e.g. 1 second) or a specific event.

If the result of at least one of tests 41, 42 and 43 is positive (i.e. an active application using the mobile network interface 107 may switch to the wireless interface 105 for test 41; the location of the device is considered as having changed and the device is considered as being in the range of an authorized wireless network for test 42; at least a device screen has switched on for test 43), during a step 44, the wireless interface 107 is switched from a low power state to a higher power state and is associated with wireless network access point. This can be done in various way, e.g. by calling a dedicated software or hardware function. For example, if the device is using Android®, it can call the function WiFiEnable( ) that turns on the wireless interface and associates the device with an access point. If finally, the device cannot connect a wireless network (no credential), the application is informed and may use the mobile network interface and the wireless interface is switched to a lower power state, the test 41 being reiterated. In a variant, the current location of device is registered with the corresponding status of wireless network (an authorized network is available or not available). During switch on of step 44, the device move from sleep state to either idle or active state according to configuration of wireless interface (default or user configuration). This new state may also depends on the event that has triggered the switch on (e.g. change from screen off to on may entail an idle state while, if an active elastic application is running and may use the wireless interface, the wireless interface is directly switched to an active state).

According to another embodiment of the invention, only one or two tests among tests 41, 42 and 43 are performed. E.g. if the device has no cellular network interface or according to specific implementation or device configuration, the test 41 is not performed.

According to another embodiment of the invention, two tests among 41, 42 and 43 must be positive to enable step 44; else, the tests 41, 42 and 43 are reiterated (either with or without a specific trigger such as a minimum test period or an event).

According to another variant of invention, all tests 41, 42 and 43 must be positive to enable step 44; else, the tests 41, 42 and 43 are reiterated (either with or without a specific trigger such as a minimum test period or an event). In some embodiments, the order of tests 41, 42, 43 is different (e.g. test 43 being performed before tests 41 and/or 42, or test 42 being performed before test 41). According to this variant, in a specific embodiment, the device moves from a first (resp. second) test to a second (resp. third) test, only if the result of the current test is positive. In this embodiment, the easier or less consuming test (e.g. test 43) is advantageously performed first. According to a specific implementation, tests 41, 42 and 43 are triggered respectively by an event (e.g. dedicated software event or dedicated hardware signal) associated respectively to the launch of an application running or susceptible to use the mobile network interface, a change of location and a screen switch on.

It would be useful to switch an application from a mobile network to a wireless network or to enable this application to run directly on the wireless network than a mobile network, because the user may prefer to use a wireless network than a mobile network (that may be more expensive to use or with a lower quality of service, a wireless network being usually faster than a mobile network). In these conditions, the invention is still enabling a save of energy, because according to state of the art, the wireless device would consumed more energy as being in state consuming power more often than according to the invention. The use of off state is increased and enables an application to run efficiently and/or without disrupting the service provided to a user.

According to a particular embodiment of the invention, the transition to wireless interface is seamless when an application is transiting from mobile network to wireless network or when it is launched directly on wireless interface. If a previous connection using a wireless interface is stopping, the application itself takes care of a new connection with another wireless network or with a mobile network. According to the specific implementation, during test 41, the device also checkes if an application using or susceptible to use the mobile network interface 107 may seamlessly use the wireless interface 105. An elastic application is an application compliant with the wireless interface and that can switch from the mobile network interface to the wireless interface; more specifically, it is an application that can use the wireless interface 105 without disruption when it is switched from a mobile network to a wireless network. Examples of elastic applications are connections to YouTube® service or web browsing. When a connection on wireless interface is disrupted, the application using the disrupted connection contacts again a corresponding distant server (that can be done using the mobile network interface); routing tables can changed at a TCP level. If a non elastic application is running on mobile network interface, the wireless network interface is not activated. According to the particular embodiment, the use of non elastic application on the mobile network interface prevents the device to switch for mobile network interface to wireless network interface, any other application continuing to use the mobile network interface; when all non-elastic applications (e.g. a game or voice over IP application) running on mobile network interface, the wireless interface can turn on (if susceptible to be used by another application). According to specific embodiments, elastic applications are identified as
  either belonging to a set of registered authorized applications, that can switch from the mobile network interface to the wireless interface;
  or not belonging to a set of registered unauthorized applications, that cannot switch from the mobile network interface to the wireless interface.

The method comprises a check, if the application is an elastic application, and if the result of the check is positive (i.e. the application is an elastic application), the application is considered as being compliant with the wireless network interface and can switch from mobile network interface to wireless network interface.

According to miscellaneous variants, the authorized or unauthorized applications are registered in the device 10 or in a distant server, that is accessed by the device 10. According to other variants, when the device 10 does not know if an application is authorized or not to switch, it first tries to switch to the wireless interface and if the behavior of application is fine (e.g. the application continues to run with a correct behavior or quality of service), then it stays on the wireless network (and may registered the application as an authorized application); else, the behavior of the application is not fine (e.g. the application stop running or have a bad behavior or quality of service), then it switches back on the mobile network (and may registered the application as an unauthorized application).

Information representative of device location is provided according to any means. This location information may, for example, be obtained from the mobile network and/or the GPS 108 and/or any user information. For this purpose, a device 10 running on Android® system may use the commands location.getAccuracy( ) location.getAltitude( ) location. getLatitude( ) and location.getLongitude( ).

Information representative of screen state is provided according to any means. This screen state information may, for example, be obtained for any dedicated software variable or hardware register. For this purpose, a device 10 running on Android® system may use the command isScreenOn( ), this function saying what is the state of a screen device.

As summary, in step 44, the wireless interface 105 being in a lower power state, it switches to a higher power state if an event associated with at least one monitored component of the device, other than a wireless network element, is detected. This enables energy to be saved in the wireless network interface 105, as the power state of the wireless interface is staying at a low level if no specific event associated with a likelihood or possibility to use the wireless network occurs. In addition, if the wireless interface is in a low power state and if an application use is detected on the mobile network interface and/or screen activity, the wireless interface is prevented to switch to a higher power state, if no authorized wireless network is available. This also enables energy to be saved.

After step 44, if the device 10 is in a high power state, during a test 45, the device checks continuously if there is no activity during a defined inactivity time threshold (e.g. 10 seconds). For this purpose, the device 10 uses a timer $T_{Timer}$ 1022 (that may be configured by a user or distant command according to miscellaneous implementations), that is launched, when an inactivity period starts on wireless interface (i.e. no application is using the wireless interface); when the timer expires, the device 10 switches the wireless interface to a lower power state. This can be done using a dedicated software or hardware command. E.g. if the device is running on Android®, it can use the command WiFiDisable( ) to turn off the wireless interface. Then, one of the tests 41, 42 and 43 is reiterated according to different implementations. According to a variant, during step 45, the device may first switch from active state after expiry of a first timer (e.g. 10 seconds) and then, to a sleep state after expiry of a second additional timer (e.g. after 5 other seconds) or according to a specific configuration of wireless interface.

As summary, in step 45, the wireless interface 105 being in a high power state, it switches to lower power state, if no activity is detected on the wireless interface during a time greater than an inactivity time threshold. This enables to switch the wireless network interface to a lower power state rather early after a period of inactivity and, thus, to save energy.

According to a specific implementation, a user may turn on the wireless interface of the device, while it is in off state.

Figure 5:
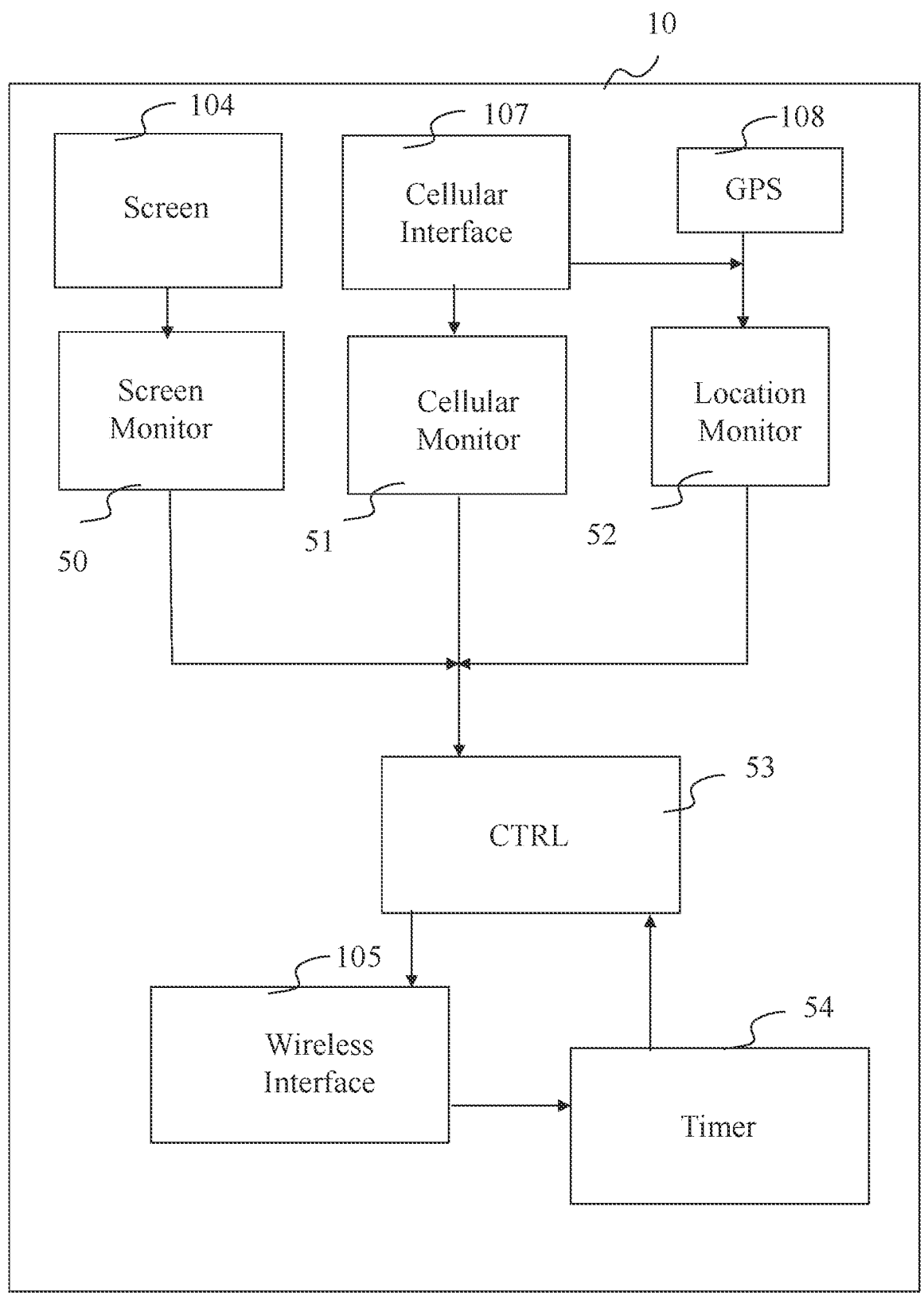
FIG. 5 is a block diagram illustrating functional modules of the wireless device of FIG. 1 or 2.

FIG. 5 illustrates a functional diagram implemented in the device 10.

The device 10 comprises a monitor adapted to monitor at least one of its component, other than a wireless network element, e.g. an application (typically a user application running on the device), an information representative of the device location, a phone use indicator such as activity on key board or switch on or wake up of the screen 104. The device 10 also comprises a switch adapted to switch a power state of the wireless interface 105 to another power state according to the monitoring result.

More specifically, the device 10 comprises:
- a screen monitor 50 adapted to monitor a state of screen 104 and perform step 43;
- a mobile network monitor 51 adapted to monitor an activity of mobile network interface and/or applications (e.g. user application) that may run on mobile network interface or wireless network interface; the monitor 51 is also adapted to perform step 41;
- a location monitor 52 adapted to monitor a device location provided by the mobile network interface 107 or GPS module 108; the monitor 52 is also adapted to perform step 42; and
- a timer 54 able to manage the timer of absence of activity on wireless network interface in view of monitoring of wireless interface 105.

The device 10 also comprises a controller 53 including a power state switch and able to switch the power state of wireless interface to a higher power state according to results provided by monitors 50 to 52. The controller 53 is also able to switch the power state of wireless interface to a lower power state according to expiry of inactivity timer 54. The controller 53 is also adapted to perform steps 44 to 46. Then, the wireless interface being in low power state, the device 10 is adapted to switch the wireless interface 105 to a higher power state if an event associated with at least one component of the device (such as screen 104, key board, user application, cell network interface and/or location), other than a wireless network element, is detected. In addition, the wireless interface 105 being in high power state, the device 10 is adapted to switch the wireless interface 105 to lower power state, if no activity is detected on the wireless interface during a time greater than an inactivity time threshold.

According to specific embodiment, the device 10 comprises mobile phone functionalities; such a device is, for example, a smart phone or a tablet fitted with a mobile network interface.

Naturally, the invention is not limited to the embodiments previously described.

In particular, the invention is compliant with any type of wireless system device that comprises at least a wireless network interface, that is adapted to have at least two power states.

The invention is not limited to switch power states of a wireless network interface having least two or three power states and applies to wireless network interfaces having more than three power states (e.g. 4, 5 or more). The invention is not limited to switch power states of a wireless network interface having on/off power states or sleep/idle/active power states and applies to wireless network interfaces having other power states that have different levels of power state from low to a high power states.

The invention is not limited to implementation in a IEEE 802.11, IEEE 802.15 or WiFi wireless interface and applies to any kind of wireless network interface having different power states.

The monitoring is not limited to mobile network application, screen state and location and can apply to monitoring of any element of the device other than a network element (e.g. user interface element or a specific element (e.g. a card reader) used by a user-application).

The implementations described herein may be implemented in, for example, a method, an apparatus, a software program or a system. Even if only discussed in the context of a single form of implementation (for example, discussed only as a method or a device), the implementation of features discussed may also be implemented in other forms (for example a program). The gateway may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Additionally, the methods may be implemented by instructions being performed by a processor in the wireless device system, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced or got by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
monitoring activity of a first wireless network interface of a device for connection to a wireless wide area network; and
switching a power state of a second wireless network interface of the device from a low power state to a higher power state based on the monitored activity for connection to a wireless local area network;
wherein the power state of the second wireless network interface is switched from the low power state to the higher power state in a case where an application causing activity on the first wireless network interface is capable to switch from the first wireless network interface to the second wireless network interface without disruption; and
wherein the second wireless network interface remains at a same power level in a case where the application causing activity is not capable to switch from the first wireless network interface to the second wireless network interface without disruption.

2. The method of claim 1, wherein it is verified that the application is capable to switch without disruption in a case where the application
belongs to a set of registered authorized applications, that can switch from the first wireless network interface to the second wireless network interface; or
does not belong to a set of registered unauthorized applications, that cannot switch from the first wireless network interface to the second wireless network interface.

3. The method of claim 1, wherein the device comprises at least one screen, and wherein the second wireless network interface switches from the low power state to the higher power state, in a case where the at least one screen of the device is switched to an active state.

4. The method of claim 1, further comprising monitoring a location of the device, wherein the monitored location of the device has been registered when the device previously connected to the wireless local area network and wherein the power state of the second wireless network interface is switched from the low power state to the higher power state in a case where a changed location of the device corresponds to a registered location of the wireless local area network.

5. A device comprising:
a first wireless network interface for connection to a wireless wide area network;
a second wireless network interface for connection to a wireless local area network; and
a processor configured to:
monitor activity of the first wireless network interface; and
switch a power state of the second wireless network interface from a low power state to a higher power state based on the monitored activity;
wherein the power state of the second wireless network interface is switched from the low power state to the higher power state in a case where an application causing activity on the first wireless network interface is capable to switch from the first wireless network interface to the second wireless network interface without disruption; and
wherein the second wireless network interface remains at a same power level in a case where the application causing activity is not capable to switch from the first wireless network interface to the second wireless network interface without disruption.

6. The device of claim 5, wherein it is verified that the application is capable to switch without disruption in a case where the application
belongs to a set of registered authorized applications, that can switch from the first wireless network interface to the second wireless network interface; or
does not belong to a set of registered unauthorized applications, that cannot switch from the first wireless network interface to the second wireless network interface.

7. The device of claim 5, further comprising at least one screen, wherein the second wireless network interface switches from the low power state to the higher power state, in a case where the at least one screen of the device is switched to an active state.

8. The device of claim 5, wherein the processor is further configured to monitor a location of the device, wherein the monitored location of the device has been registered when the device previously connected to the wireless local area network and wherein the power state of the second wireless network interface is switched from the low power state to the higher power state in a case where a changed location of the device corresponds to a registered location of the wireless local area network.

9. A computer program product comprising computing instructions stored on at least a non-transitory computer storage medium wherein the computing instructions when executed by at least a processor, configure the at least a processor to:

monitor activity of a first wireless network interface of a device for connection to a wireless wide area network; and switch a power state of a second wireless network interface of the device from a low power state to a higher power state based on the monitored activity for connection to a wireless local area network;

wherein the power state of the second wireless network interface is switched from the low power state to the higher power state in a case where an application causing activity on the first wireless network interface is capable to switch from the first wireless network interface to the second wireless network interface without disruption; and wherein the second wireless network interface remains at a same power level in a case where the application causing activity is not capable to switch from the first wireless network interface to the second wireless network interface without disruption.

10. The computer program product of claim 9, wherein it is verified that the application is capable to switch without disruption in a case where the application belongs to a set of registered authorized applications, that can switch from the first wireless network interface to the second wireless network interface; or does not belong to a set of registered unauthorized applications, that cannot switch from the first wireless network interface to the second wireless network interface.

11. The computer program product of claim 9, wherein the device comprises at least one screen, and wherein the second wireless network interface switches from the low power state to the higher power state, in a case where the at least one screen of the device is switched to an active state.

12. The computer program product of claim 9, wherein the at least a processor is further configured to monitor a location of the device, wherein the monitored location of the device has been registered when the device previously connected to the wireless local area network and wherein the power state of the second wireless network interface is switched from the low power state to the higher power state in a case where a changed location of the device corresponds to a registered location of the wireless local area network.

* * * * *